W. GARTZE.
RATCHET WRENCH.
APPLICATION FILED AUG. 12, 1910.
980,626.
Patented Jan. 3, 1911.
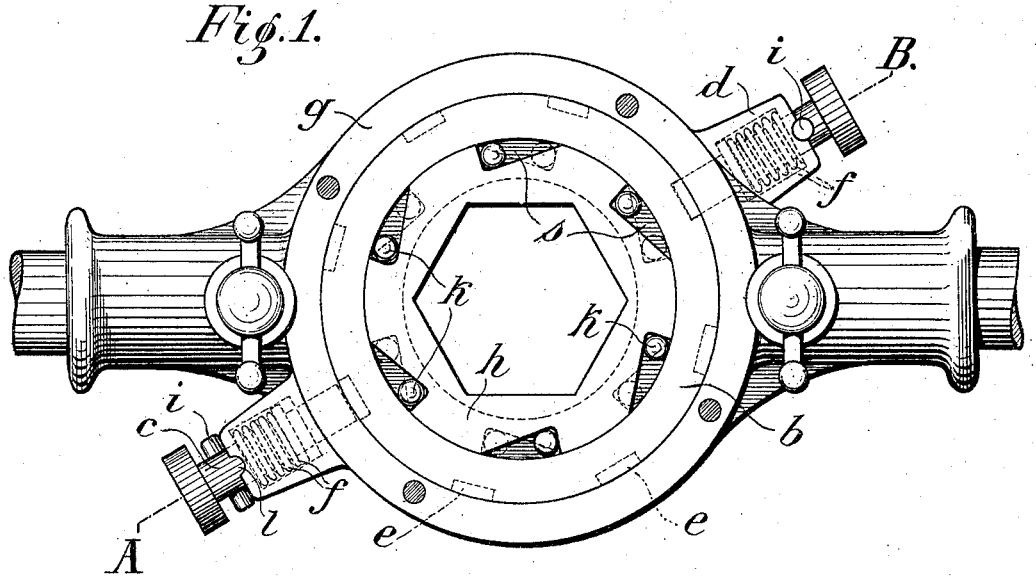
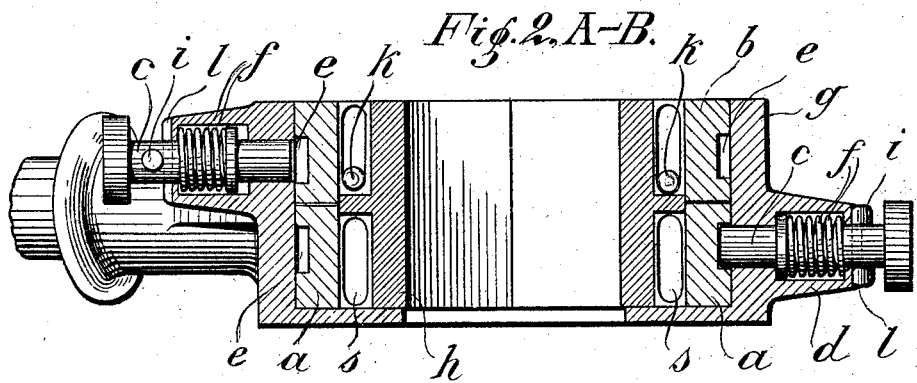

UNITED STATES PATENT OFFICE.

WALTER GARTZE, OF SOLINGEN-MANGENBERG, GERMANY.

RATCHET-WRENCH.

980,626. Specification of Letters Patent. Patented Jan. 3, 1911.

Application filed August 12, 1910. Serial No. 576,838.

*To all whom it may concern:*

Be it known that I, WALTER GARTZE, a citizen of Germany, residing at Solingen-Mangenberg, Germany, have invented an Improved Ratchet-Wrench, of which the following is a specification.

This invention relates to a ratchet wrench of novel construction, which is adapted to be so set as to turn a suitable tool in either direction. Thus when the invention is applied to a screw stock, either a left thread or a right thread may be cut.

In the accompanying drawing: Figure 1 is a plan of a ratchet wrench embodying my invention, and Fig. 2 a section on line A—B, Fig. 1.

A cylindrical tool holder $h$ is provided with an eye of a shape to grasp the correspondingly shaped tool. Holder $h$ is encompassed by a pair of superposed rings $a$, $b$, of like diameter and embracing the lower and upper half of the holder respectively. Rings $a$, $b$ are in turn embraced by a rotatable casing $g$ having suitable handles, and of a height to contact with the outer faces of both rings.

Intermediate holder $h$ and each of the rings $a$, $b$, there is formed a friction clutch, shown to consist of a number of wedge-shaped dental recesses $s$ adapted for the reception of friction balls or rollers $k$. Recesses $s$ are shown to be formed in the outer face of holder $h$, so that rollers $k$ will be forced against the inner faces of rings $a$, $b$, but it is obvious that this arrangement may be reversed. The pitch of the recesses $s$ in the lower part of holder $h$ is opposed to that in the upper part, so that the rings are adapted to turn the holder in opposite directions.

Means are provided for separately coupling rings $a$, $b$, to casing $g$, so that the coupled ring partakes in the movement of the casing. These means consist of bolts $c$ influenced by springs $f$ and guided in bosses $d$ of the casing. Within the outer faces of rings $a$, $b$ are formed sockets $e$, into which the ends of the bolts may be projected. Bosses $d$ are provided with grooves $l$ adapted to be engaged by pins $i$ carried by bolts $c$. When the pins are in the grooves, the plungers or bolts $c$ are in locking engagement with the rings. When the bolts are retracted and turned to bring pins $i$ transversely of the grooves, the bolts are held out of locking engagement with the rings.

If ring $b$ is coupled to casing $g$ and the latter is reciprocated, holder $h$ will be advanced by the friction clutch at each turn to the right, while it will remain stationary at each turn to the left, so that the tool is intermittently turned to the right. If ring $a$ is coupled to casing $g$, the tool will in like manner be intermittently turned to the left. If both rings are coupled to the casing, a reciprocative movement will be imparted to the tool.

I claim:

1. A ratchet wrench, comprising a tool holder, a pair of superposed rings surrounding said holder, oppositely set friction members intermediate holder and rings, a rotatable casing surrounding the rings, and separate means for coupling each of said rings to said casing.

2. A ratchet wrench comprising a tool holder, a pair of superposed rings surrounding said holder, oppositely set friction members intermediate holder and rings, a rotatable casing surrounding the rings, and bolts engaging the casing and adapted to separately couple each of said rings to the holder.

3. A ratchet wrench comprising a tool holder, a pair of superposed rings surrounding the holder, oppositely set friction members intermediate holder and rings, a rotatable casing surrounding the rings and having bosses, spring-influenced bolts engaging the bosses and adapted to interlock with the rings, and means for holding the bolts in their retracted position.

WALTER GARTZE. [L. S.]

Witnesses:
 WALTER VONNEGUT,
 ALFRED HENKEL.